(12) United States Patent
Warren

(10) Patent No.: US 12,384,561 B1
(45) Date of Patent: Aug. 12, 2025

(54) SATELLITE CROSS-TRACK SCANNING AND IMAGE CAPTURE

(71) Applicant: EarthDaily Analytics USA, Inc., Maple Grove, MN (US)

(72) Inventor: Michael S. Warren, Los Alamos, NM (US)

(73) Assignee: EarthDaily Analytics USA, Inc., Maple Grove, MN (US)

( * ) Notice: Subject to any disclaimer, the term of this patent is extended or adjusted under 35 U.S.C. 154(b) by 0 days.

(21) Appl. No.: 17/504,099

(22) Filed: Oct. 18, 2021

Related U.S. Application Data

(60) Provisional application No. 63/175,497, filed on Apr. 15, 2021.

(51) Int. Cl.
*B64G 1/10* (2006.01)
*B64G 1/24* (2006.01)
*B64G 1/66* (2006.01)
*G06V 20/13* (2022.01)
*H04N 23/45* (2023.01)
*H04N 23/58* (2023.01)
*H04N 23/80* (2023.01)

(52) U.S. Cl.
CPC ........... *B64G 1/1021* (2013.01); *B64G 1/244* (2019.05); *B64G 1/66* (2013.01); *G06V 20/13* (2022.01); *H04N 23/45* (2023.01); *H04N 23/58* (2023.01); *H04N 23/80* (2023.01); *B64G 1/1028* (2023.08)

(58) Field of Classification Search
CPC ........ B64G 1/1021; B64G 1/244; B64G 1/66; B64G 2001/1028; G06V 20/13; H04N 5/2258; H04N 5/2259; H04N 5/23229
See application file for complete search history.

(56) References Cited

U.S. PATENT DOCUMENTS

| | | | | |
|---|---|---|---|---|
| 4,823,402 | A * | 4/1989 | Brooks | H04B 10/11 398/124 |
| 8,594,375 | B1 * | 11/2013 | Padwick | G06T 7/0008 382/103 |
| 9,063,391 | B2 * | 6/2015 | Yavin | G03B 15/00 |
| 10,598,488 | B2 * | 3/2020 | Cao | B64G 1/242 |
| 11,232,685 | B1 * | 1/2022 | Nixon | G08B 13/19695 |
| 2015/0348264 | A1 * | 12/2015 | Yoon | B64G 1/361 348/117 |
| 2015/0371431 | A1 * | 12/2015 | Korb | G06V 10/60 382/113 |
| 2017/0061625 | A1 * | 3/2017 | Estrada | G06N 3/04 |
| 2017/0250751 | A1 * | 8/2017 | Kargieman | G06V 20/13 |
| 2018/0180476 | A1 * | 6/2018 | Richarte | G01J 3/04 |

(Continued)

OTHER PUBLICATIONS

Kaushal et al., "Acquistion, Tracking, and Pointing", Jan. 2017.*

(Continued)

*Primary Examiner* — James T Boylan
(74) *Attorney, Agent, or Firm* — Scale LLP

(57) ABSTRACT

A satellite for software-defined satellite imagery includes an optical assembly. The satellite further includes an attitude control system. The attitude control system is configured to control an orientation of the satellite such that the optical assembly slews across a ground track of the satellite. The satellite further includes a set of image sensors configured to capture an image using light directed to the set of image sensors at least in part by the optical assembly.

14 Claims, 8 Drawing Sheets

(56) References Cited

U.S. PATENT DOCUMENTS

| | | | | |
|---|---|---|---|---|
| 2018/0239982 | A1* | 8/2018 | Rutschman | H04N 23/695 |
| 2018/0286052 | A1* | 10/2018 | McArdle | G06T 7/20 |
| 2019/0257561 | A1* | 8/2019 | Pasarkar | F25B 39/00 |
| 2019/0354741 | A1* | 11/2019 | Yang | G06V 20/13 |
| 2022/0329736 | A1* | 10/2022 | Schlaerth | H04N 23/67 |

OTHER PUBLICATIONS

Sun et al., "Compensation method for the image motion of a rotary-scan space camera" Nov. 2020.*

Fujita et al. "Attitude Maneuvering Sequence Design of High-Precision Ground Target Tracking Control for Multispectral Earth Observations", International Symposium on System Integration, Paris, France, Jan. 14-16, 2019.*

Wallis et al. "Optimal scan strategies for future CMB satellite experiments", Monthly Notices of the Royal Astronomical Society, 10-8 -2016.*

Xu et al. "Imaging Velocity Fields Analysis of Space camera for Dynamic Circular Scanning", IEEE, Oct. 30, 2020.*

AIRS Project Instrument Suite Website, date provided from Internet Wayback Archive, Website as follows with a date provided of Mar. 20, 2021: https://web.archive.org/web/20210320001053/https://airs.jpl.nasa.gov/mission/airs-project-instrument-suite/footprints/.*

Liu et al. "Digital Modeling Simulation System of Agile Satellite Operation State", IEEE 3rd Internation Conference on Electronic Information and Communication Technology, Nov. 13-15, 2020.*

Ebrahimi "On-orbit Inter-satellite Radiometric Calibration of Cross-track Scanning Microwave Radiometers", University of Central Florida, 2016.*

* cited by examiner

SATELLITE CROSS-TRACK SCANNING AND IMAGE CAPTURE

CROSS REFERENCE TO OTHER APPLICATIONS

This application claims priority to U.S. Provisional Patent Application No. 63/175,497 entitled SOFTWARE DEFINED SATELLITE IMAGERY filed Apr. 15, 2021 which is incorporated herein by reference for all purposes.

BACKGROUND OF THE INVENTION

The resolution and collection rate of existing satellite imagery data is constrained, limiting the type of analytics that can be performed. For example, a typical source of satellite imagery may provide global coverage every three to four days, with a resolution of 10 meters. However, at this resolution, it may be difficult to obtain detailed observations, such as whether a factory is operating, the type of vehicle that is in a certain area, the volume of a pile of coal at a port, or a pile of grain next to a silo.

Being able to measure such detail requires resolution that is better than, for example, a meter. However, existing satellites that are able to capture images of such a resolution are expensive, and are only capable of imaging a small fraction of the Earth's surface each day.

Further, because of the expense of existing satellites, the cost per unit area (e.g., cost per square kilometer) of the imagery is high, preventing consumers of the imagery from being able to monitor an area frequently. For example, it may be costly to obtain a license for high frequency updates to high resolution images, which may present a high barrier to performing certain types of analysis, such as determining whether a factory is operating, or detecting a change. Further, due to the cost of capturing imagery using existing satellites, consumers are typically charged for a minimum amount of imagery even though they may only be interested in a small portion of that imagery data. For example, consumers with small sites such as a port or a single factory may wish to task a commercial satellite, however, they may be required to pay for imagery that covers one hundred square kilometers, even though they may only be interested in one percent of that data.

BRIEF DESCRIPTION OF THE DRAWINGS

Various embodiments of the invention are disclosed in the following detailed description and the accompanying drawings.

DETAILED DESCRIPTION

Figure 1:
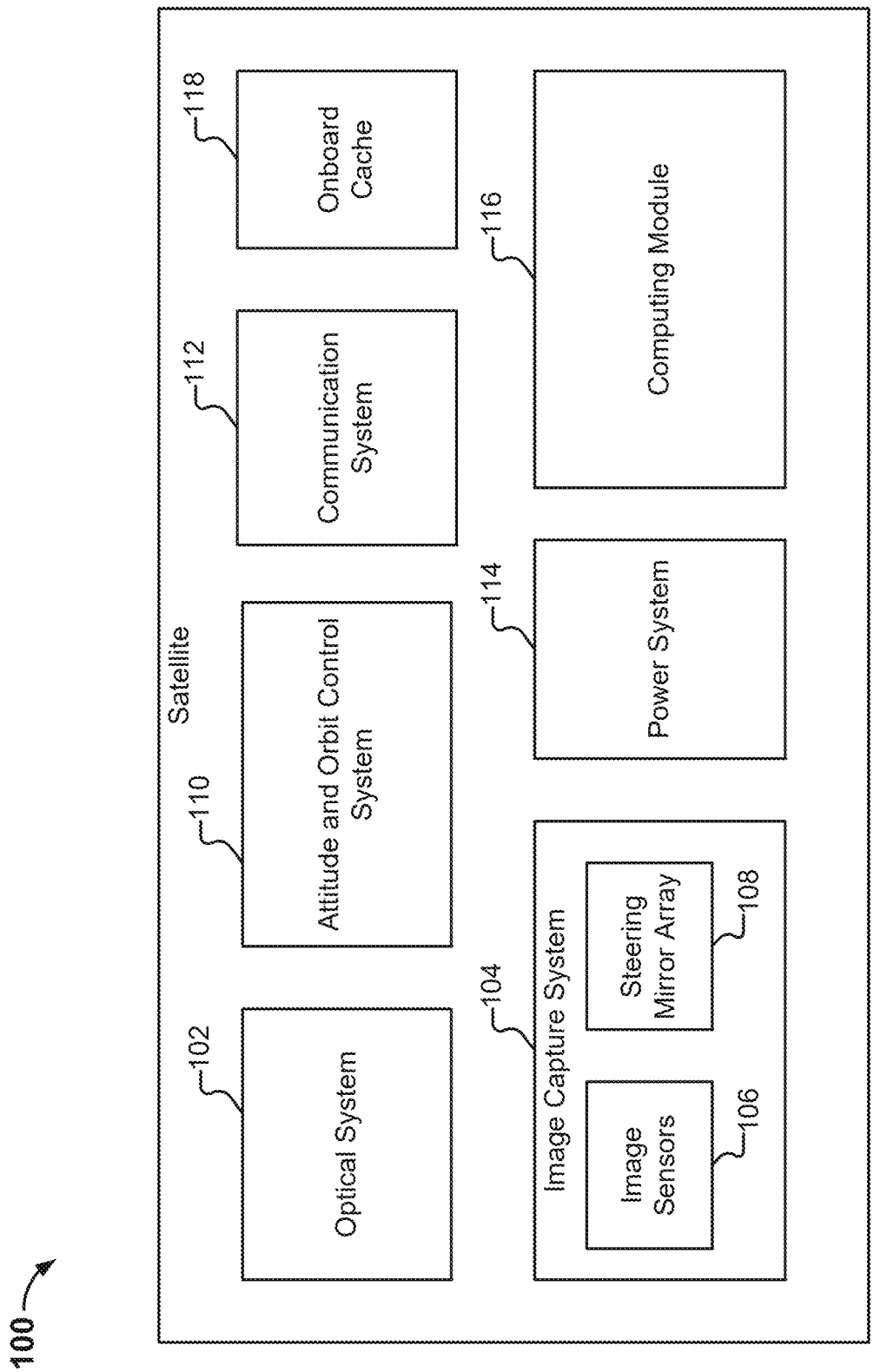
FIG. 1 illustrates an embodiment of a satellite configured for high data rate image collection and processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for software defined satellite imagery. Embodiments of techniques for software defined satellite imagery include a hardware implementation of a satellite for capturing satellite imagery. Using the satellite described herein, improved imagery for performing predictive analytics may be captured.

The software-defined satellite imagery techniques described herein are analogous to a software-defined radio, where radio signals are converted to digital form, and the processing of the analog radio signal via hardware components such as resistors and capacitors and other circuits is instead performed via software. In the case of software-defined satellite imagery, the captured image signals are converted to digital form in an early stage of the processing chain, where software is then used to perform digital processing of the raw image data. Using the software-defined satellite imagery techniques described provides various benefits. For example, the software is much more flexible than having to build physical circuits, and the front end becomes simplified.

For example, using the satellites described herein, high resolution imagery may be captured with a higher coverage as compared to existing satellites. For example, the satellites described herein may be used to image the entire Earth every day at a 25 to 50 centimeter resolution. Further the satellite design described herein, as compared to existing satellites of comparable capabilities, is relatively inexpensive to build and launch. Using the satellite imagery collection techniques described herein, the entire Earth may be imaged every day at a resolution of 25-50 cm resolution with a single satellite or a constellation of satellites.

Using embodiments of the software-defined satellite imagery techniques described herein, the cost of collection of satellite imagery may be reduced, such that consumers need not be concerned with the cost per square kilometer or pixel of imagery, but rather may derive value from the imagery and the analysis of those images. Further, using the software-defined satellite imagery techniques described herein, small consumers that are interested in imagery of a small area need not be made to pay for imagery of a minimum amount of area that exceeds their needs.

The expense of existing high-resolution optical satellites is typically driven by physical constraints, such as the aperture of the optics, where the larger the aperture, the higher the ultimate resolution (e.g., according to the Rayleigh criterion). For example, for a 25 centimeter resolution image for the middle of the visual band of green light, a 1.3 meter aperture is needed. Such a large mirror is an expensive piece of equipment that requires specialized engineering. Further, a telescope with such a larger aperture is not feasible for use with a small satellite, where existing small satellites that may be the size of a bread box typically have an aperture on the order of 10 centimeters.

Additionally, in the traditional way of collecting satellite imagery, the telescope is pointed at the ground of the Earth, and as the satellite goes around its orbit, pictures are taken of whatever is in the telescope's field of view. This traditional approach to scanning the Earth has been a good fit for the rate at which existing CCD cameras could capture images, the corresponding electronics could process the imagery, and the downlink could send the imagery down to the Earth. However, with advances in camera technology, image processing, and communications technology, the telescopes in existing satellites are not being used to their full potential.

In comparison to existing satellite image collection techniques, the software-defined satellite imagery techniques described herein provide high resolution imagery with a far higher rate of coverage, even with a small size satellite. As described herein, the software-defined satellite imagery techniques include two portions.

A first part includes increasing the collection rate of raw imagery (e.g., the amount of the surface of the Earth that is captured by image sensors per unit time). Using embodiments of the scanning and imaging techniques described herein, collection rates that are much higher than the natural collection rate defined by the movement of the satellite over the ground can be achieved. Embodiments of techniques for increasing the collection rate further include two parts, one related to increasing the physical scanning rate of the satellite, and a second related to increasing the capture rate of imagers in order to capture images of what is being observed by the telescope at a rate that matches or keeps up with the increased scanning rate.

Increasing the scanning rate of the satellite includes techniques for increasing the scanning and coverage rate of the optical assembly of the telescope. In some embodiments, this includes physical manipulation of the satellite to increase the scanning coverage of the optical assembly, and the rate at which the surface of the Earth is scanned. As will be described in further detail below, this includes performing cross-track scanning (e.g., scanning that is perpendicular or orthogonal to the ground track of the satellite). In some embodiments, cross-track scanning allows the telescope to not only point straight down and allow the Earth to pass by (as is done with existing satellites and is the natural collection rate defined by the movement of the satellite over the ground), but move or slew the telescope across the ground track, such as by either spinning the telescope around perpendicular to its orbit or in other control schemes where the telescope is manipulated to rapidly move or change where it is pointing on the Earth to maximize the data rate from the camera and capability of the electronics in the camera to process that amount of imaging data. The cross-track scanning techniques described above greatly increase the coverage of the Earth by the telescope, as well as the amount of the Earth that is observed per unit time (e.g., the rate at which the Earth is covered by the telescope). Further details regarding cross-track scanning are described below.

A second part of increasing the collection rate includes improvements to the configuration of the camera or imager, such as techniques for increasing the rate of image capture in order to keep pace with the increased scanning rate achieved using the cross-track scanning described herein (that is, improving the imager to be able to actually capture and take images at the increased speed at which the Earth is being scanned by the physical optical assembly). In this way, the imager described herein is able to capture what is observed by the telescope (at the increased scanning rate provided by cross-track scanning) at an image capture rate that is not possible using existing imagers The software-defined satellite imagery techniques described herein further include onboard processing at the satellite. Using the cross-track scanning and image capture enhancements described herein, the collection rate of raw satellite image data is greatly increased as compared to existing satellite imaging techniques. That is, the light observed by the telescope is converted to a stream of pixels from a camera into a digital form, where the amount or volume of raw data that is generated is higher than existing systems. However, the resulting data collection rates may greatly exceed the capacity of existing downlinks (between the satellite and the ground). That is, it can be difficult and/or expensive to transmit all of the raw data down to the Earth. In some embodiments, the software-defined satellite imagery techniques described herein include performing additional onboard processing to maximize the benefit of the increased data collection rate in a manner that takes into account constraints such as network bandwidth limitations of the satellite. As will be described in further detail below, in some embodiments, such local processing includes performing filtering at the satellite so that only pixels of potential value or interest are transmitted. For example, a picture of a cloud is typically of little to no value, and it would be an inefficient use of downlink budget to send that picture, since it would likely be discarded at the ground. In some embodiments, satellite processing is performed to filter out pictures of clouds from being transmitted, thereby reducing the usage of communications bandwidth on raw image data that is not of potential interest. As another example, approximately two-thirds of the Earth is covered with oceans. In some embodiments, local processing is performed at the satellite to determine whether there are any objects of potential interest in an image of the ocean, or whether the ocean is empty of anything other than water. In some embodiments, if local processing at the satellite determines that the image is only of empty water, then this image is filtered out (because such images are deemed to not be of interest) and the limited downlink capacity is not used to communicate that image. Further details and embodiments regarding onboard processing of collected/captured image data are described below.

FIG. 1 illustrates an embodiment of a satellite configured for high data rate image collection and processing.

In this example, satellite 100 includes optical system 102. As one example, the optical or telescope design of the satellite (also referred to herein as an "optical assembly") is implemented using a TMA (three-mirror anastigmat) telescope. In a TMA telescope, the three mirrors allow for control of different types of optical distortions that occur. The design of the mirrors sets various imaging parameters. For example, the diameter of the mirror sets the resolution. Other dimensions, such as the distance between the secondary mirror and primary mirror and the length of the telescope, can vary depending on the design, where the design may be constrained by the size of the satellite, which may be limited by the cargo capacity of the vehicle used to launch the satellite. Other optical systems may also be used.

In this example, satellite 100 includes image capture system 104. The image capture system (also referred to herein as an "imager") is configured to capture images of the scene or portion of the Earth that the telescope or optical system is pointed at. In this example, image capture system 104 further includes image sensors 106 and steering mirror array 108.

The image sensors 106 may be implemented using various camera technologies such as CCD (charge-coupled device) technology or CMOS (complementary metal-oxide-semiconductor) sensor technology. CMOS image sensors may be used for their ability to quickly read pixels out of the camera/imager, although they may have a tradeoff in terms of sensitivity. CCDs may provide the ability for thinning and backside illumination. In some embodiments, and as will be described in further detail below, the image sensors are utilized as a TDI sensor (time domain integration sensor). Further details regarding image sensors, such as the manner in which an array of image sensors is oriented and used, are described below.

In some embodiments, and as will be described in further detail below, the satellite includes an array of fast steering mirrors 108, which are used to freeze the observed ground motion onto an array of frame imagers (e.g., the image sensors of image sensors 106). Further details and embodiments regarding the configuration of an array of fast steering mirrors and their use are described below.

In this example, satellite 100 includes attitude and orbit control system 110. In some embodiments, attitude and orbit control system 110 is configured to control the orbit and attitude or orientation of the satellite. In various embodiments, the attitude and orbit control system includes components such as GPS (Global Positioning System) receivers, assemblies for star tracking, gyroscopes, coarse Earth and sun sensors, fluxgate magnetometers, inertial measurement units, magnetic torquers, cold gas propulsion systems, etc. In some embodiments, the satellite is designed such that the moment of inertia is minimized, such as when the satellite is in a mode where it is constantly changing direction. As will be described in further detail below, in some embodiments, the satellite is physically controlled via the attitude and orbit control system to perform cross-track scanning.

In this example, satellite 100 includes communication system 112. The communication system includes components for transmitting information between the satellite and the ground (Earth). This includes providing the downlink for transmitting, to the ground (e.g., at a base station at the ground with a transceiver), satellite imagery captured and processed by the satellite.

In this example, satellite 100 includes power system 114. The power system includes components for providing power to the satellite, such as solar arrays, batteries, etc.

In this example, satellite 100 includes computing module 116. In some embodiments, the computing module includes one or more processors usable to control the operations of the satellite. This includes providing instructions to the attitude and orbit control system to control its orientation and orbit. The computing module further includes processors for performing onboard processing of collected raw imagery, as will be described in further detail below. In some embodiments, the components of the satellite include space qualified hardware that is shielded from radiation to minimize errors. In some embodiments, there are multiple computing devices that are available for redundancy and/or parallelization.

In this example, satellite 100 includes onboard cache 118. As will be described in further detail below, in some embodiments, the onboard cache is used to cache collected raw image data so that it can be accessed at a later time.

The following are further details and embodiments of software defined satellite imagery.

Cross-Track Scanning

The following are details and embodiments of techniques for cross-track scanning.

Existing high-resolution optical satellite imagery is currently collected at a maximum rate of approximately 200 square kilometers per second. This is set by the product of the maximum field-of-view (FOV) of the optical instrument (~10-25 km) and the rate at which the satellite travels over the ground (~7 km/sec at an orbital height of 500 km). In existing high-resolution optical satellite imagery, regardless of the type of imaging system, the overall amount of the ground imaged per second for along-track scanning is the same.

The following are techniques for satellite attitude control for collecting high-resolution optical and near-infrared imagery. Using embodiments of the techniques described herein, the collection rate for high-resolution optical and near-infrared imagery can be dramatically increased. As will be described in further detail below, in some embodiments, performing attitude control for collecting satellite imagery includes facilitating cross-track scanning. As will be described in further detail below, by slewing the optical instrument FOV across the ground track of the satellite (e.g., perpendicular to the typical collection geometry, which includes scanning along the ground track), much greater collection rates are possible at the focal plane of the instrument.

Compared to existing satellites, whose scanning is limited to what is being pointed to along the track of orbit, using the cross-track scanning control techniques described herein, the telescope may observe a much greater area or swath of the Earth over the course of its orbit.

The following include examples and embodiments of increasing collection rate for high resolution optical and near-infrared imagery by controlling the physical dynamics of the optical assembly of a satellite, and the manner in which the Earth is scanned. This includes manipulating the physical behavior (e.g., attitude or orientation) of the satellite to perform cross-track scanning.

Figure 2:
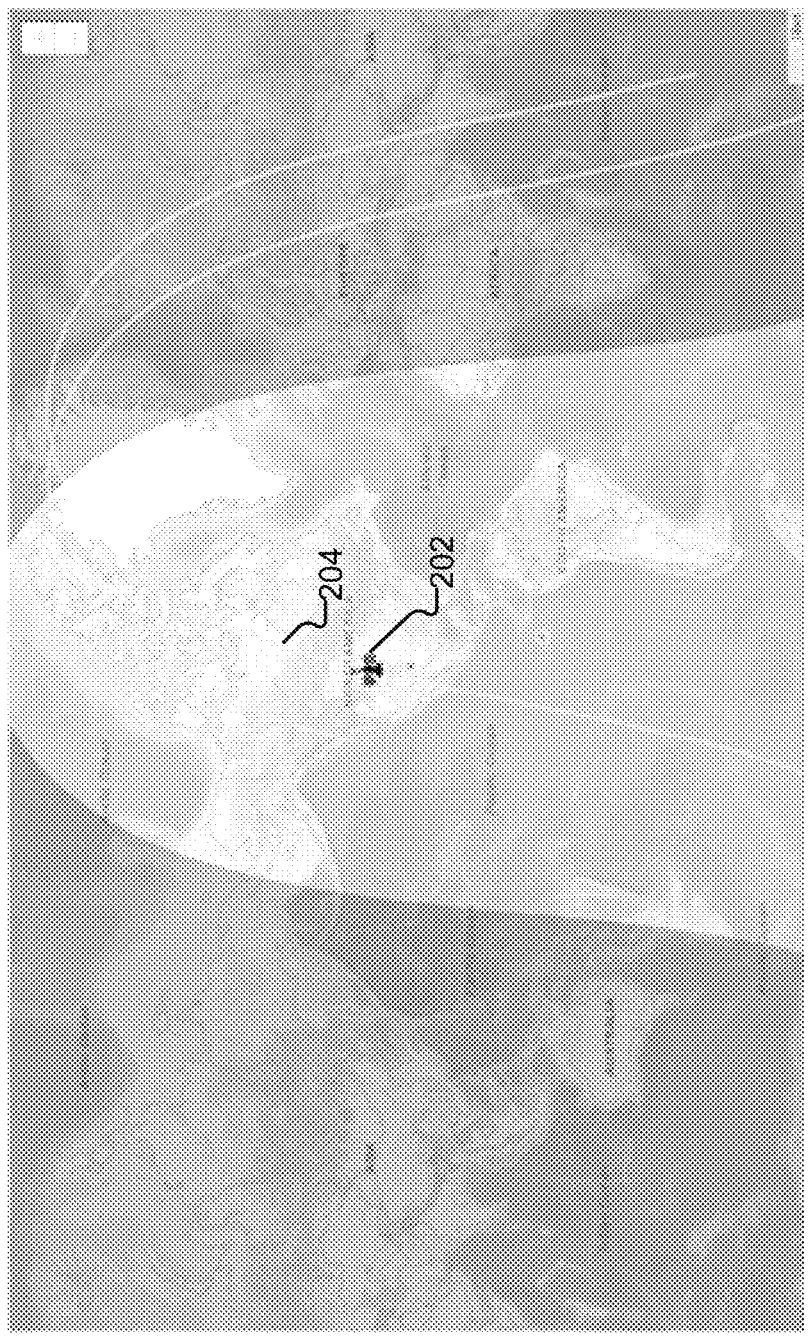
FIG. 2 illustrates an embodiment of a ground track of a satellite in sun-synchronous low Earth orbit (LEO).

FIG. 2 illustrates an embodiment of a ground track of a satellite in sun-synchronous low Earth orbit (LEO). The ground track path of a satellite 202 is shown at 204.

Figure 3:
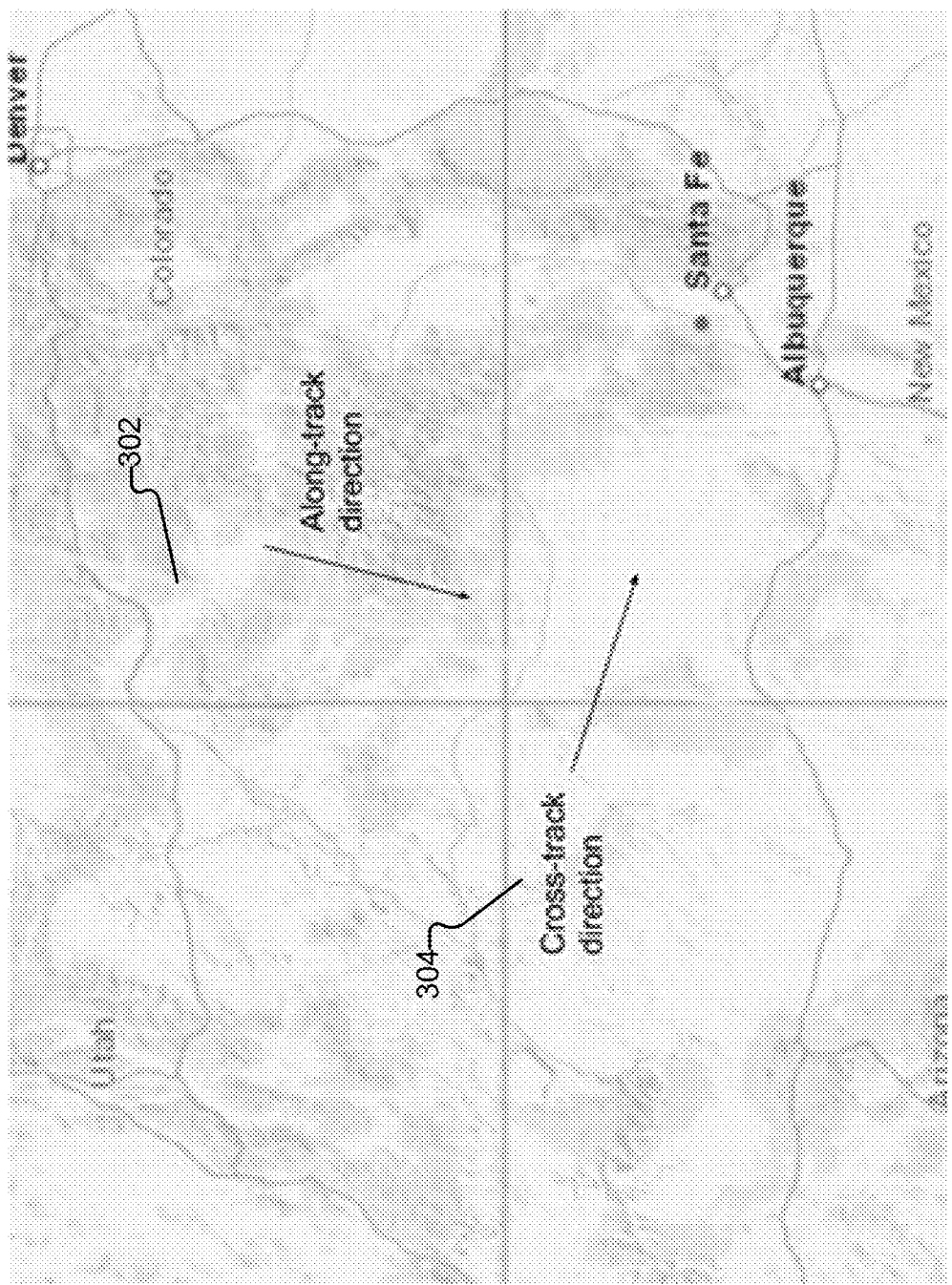
FIG. 3 illustrates an embodiment of cross-track and along-track directions.

FIG. 3 illustrates an embodiment of cross-track and along-track directions.

Along-track direction 302 is an example of ground track 204, which is the path on the surface of the Earth (or any other surface, as appropriate) directly below the satellite's trajectory or orbit. In this example, cross-track direction 304 is defined as the direction perpendicular or orthogonal to the along-track direction. As will be described in further detail below, cross-track scanning includes physically manipulating the telescope to scan along the cross-track direction. While a cross-track that is perpendicular to the along-track direction is described herein for illustrative purposes, cross-track scanning may apply to scanning along any track that is not parallel to the along track direction of the satellite.

In various embodiments, the cross-track scanning is implemented in three example modes or ground track patterns: spin, slow, and precession. In some embodiments, the different types of cross-track scanning patterns are implemented using attitude and orbit control system 110. Other types of scanning patterns may be configured. In some embodiments, the different modes are controlled via attitude control (e.g., attitude and orbit control system 110). The attitude control includes manipulation of gyroscopes. For example, to control the attitude, the spinning mass of the gyroscope is used to conserve the total angular momentum of the entire satellite so that if a motor is used to point the gyroscope in one direction, then the telescope itself is on a gimbal that moves in the other direction.

Spin Mode

Figure 4:
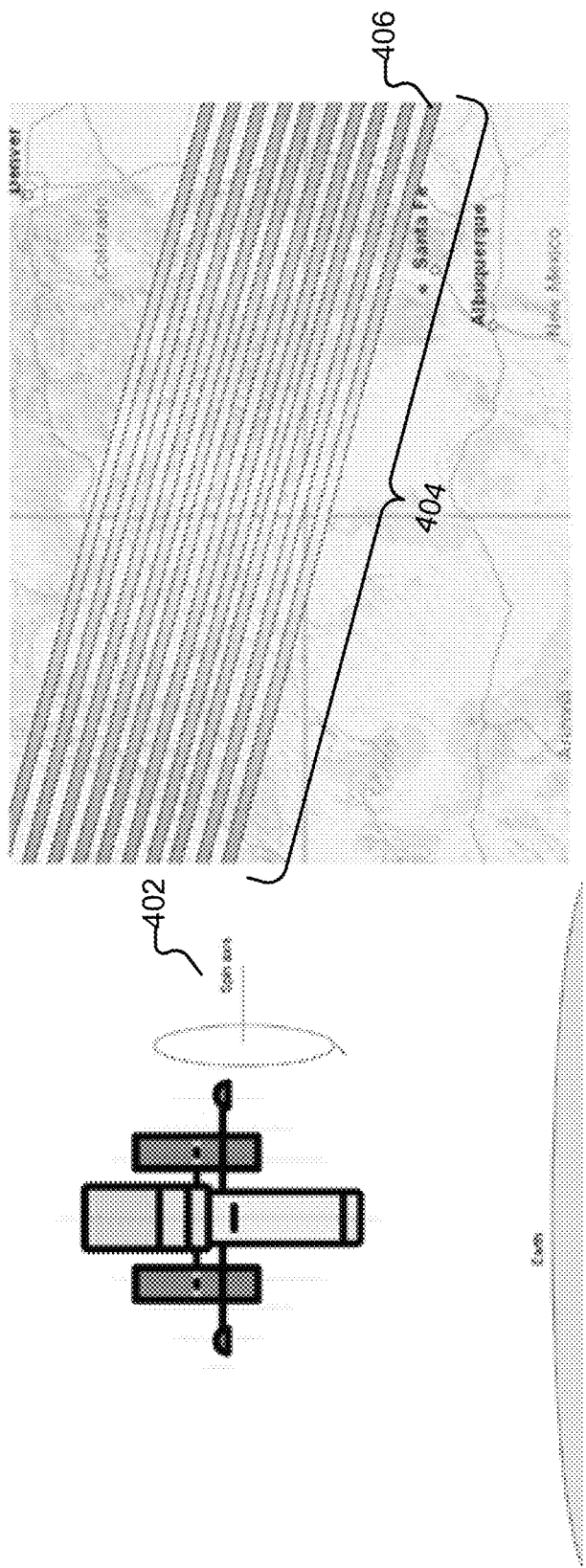
FIG. 4 illustrates an embodiment of spin-based cross-track scanning.

FIG. 4 illustrates an embodiment of spin-based cross-track scanning. As shown in this example, cross-track scanning is facilitated by rotating the entire optical assembly around the orbital direction of the satellite, where the spin axis is shown at 402.

Shown in the example at 404 is an image collection geometry over one minute for "spin" at 10 revolutions per minute (RPM). In this example, if the spin rate is increased to 20 rpm, images would overlap. In this example, the geometry of the strips (e.g., strip 406) is 26 km across at the nadir point for a 3 degree FOV, and up to 2600 km wide. A strip represents a swath of a portion of the surface of the Earth that the telescope is able to "see" as it rotates about the spin axis while the satellite is also moving along the ground track.

In the spin control mode for cross-tracking, active gyroscopic control is not needed as the entire satellite (except for components such as communications systems which should be kept pointed at the ground and/or solar panels that should be kept pointed at the sun) is spinning around without any forces acting on it. Thus, the spin mode has a benefit in that the attitude control is relatively simplistic. One limitation of the spin mode is that the satellite is only pointing at the Earth a percentage of the time (e.g., 25% of the time), where the remainder of the time the telescope is pointing away from the ground, such as to the side or into space.

Slower corrections may be applied in this mode. For example, to keep the satellite and telescope pointed straight down as the satellite spins around, as it is orbiting the Earth, the satellite is likely in polar orbit. Corrections may be made to adjust the tilt of the satellite as it orbits around the Earth to keep the telescope pointed at the ground, otherwise, the satellite would continue to point with respect to an inertial system of the solar system itself. For example, if the satellite were pointed straight down at the North Pole, without tilt correction, once the satellite reached the equator, the satellite would not see the Earth because it is spinning around, looking off to the side of the Earth.

The slow, gradual corrections may be made using gyroscopic control. For example, the forces involved may be relatively small, as it may take 90 minutes to orbit the Earth, where the correction would involve a rotation in the other dimension once over 90 minutes.

Slew Mode

In some embodiments, slewing mode includes controlling the satellite so that it is continuously pointed at the Earth and collecting images, even while moving back and forth across the cross-track. This includes slewing or sweeping the satellite back and forth across the orbit path of the satellite. This may require relatively large forces in order to change the orientation of the satellite.

Figure 5:
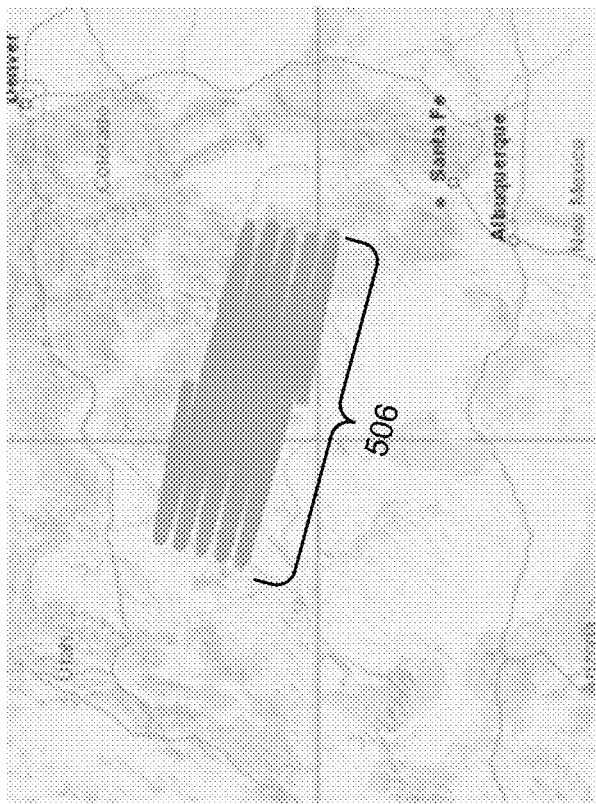
FIG. 5 illustrates an embodiment of slew-based cross-tracking.
Figure 5:
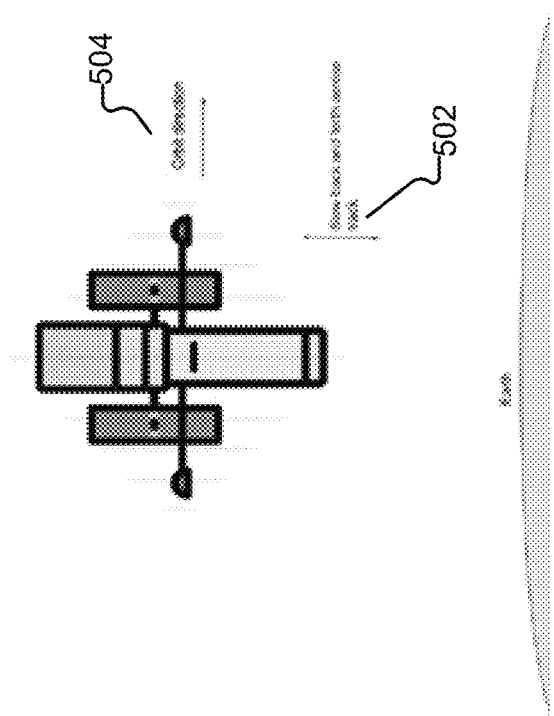

FIG. 5 illustrates an embodiment of slew-based cross-tracking. In this example, cross-track scanning is implemented by slewing the satellite back and forth across the ground track by pointing the satellite instrument with a control moment gyroscope. This has the advantage of always pointing at the Earth and collecting data, although the slew rate across the track may be lower as compared to the spin mode. As shown at 502, the satellite is slewed back and forth across the orbital track, where the orbit direction is shown at 504.

Shown in this example at 506 is an image collection geometry over one minute for "slew" at 6 seconds per cycle. In this example, the geometry of the strip is 26 km across at the nadir point for a 3 degree FOV, and 300 km wide. In this example, the satellite is pointing from one direction to the other in the span or timescale of seconds. The slewing is implemented using gyroscopic attitude control.

In this slew mode, the satellite is always pointed at the surface, and is continuously collecting imagery. One potential tradeoff of this slew mode is that half of the desired area is collected in this mode, where satellites are launched to have complete coverage. This provides the option to optimize the size and the amount each satellite has to do. For example, multiple satellites may be launched, where instead of having a single satellite cover the entire width of its orbital path, there is a constellation of satellites, such as two or four satellites, each collecting imagery for their respective subsets of the Earth.

Various parameters of the slewing may be adjusted. For example, the amount of slew (e.g., amount by which the optical assembly is swung back and forth, or the total side-to-side motion) may be adjusted, where the larger the slew, the larger the area that is covered by the telescope.

The speed of the slewing may also be adjusted. In some embodiments, the speed of the slewing (the rate at which the optical assembly is swung back and forth) may be set based on the rate at which the satellite travels over the ground, which is fixed (approximately 7 kilometers per second). The speed of the slewing is adjusted to minimize the gaps in between slewing passes. This includes adjusting the slewing to have overlap between slewing passes. For example, objects that are moving will have shifted in the time between two passes. In this way, with overlap between slewing passes, the speed of moving objects may be determined. Increasing the speed of slewing also increases the data rate, as there will be multiple images that are being obtained of a large fraction of the scanned area, instead of one image.

In some embodiments, one or more of the slewing parameters are determined based on the field of view of the optical system. For example, as part of the three-mirror design (TMA), as the FOV is made larger, the tolerances on the mirrors become stricter. As one example, the optical system has a three degree FOV, which is equivalent to approximately 26 kilometers on the ground. This is the width of the swathe that the camera looks at. In some embodiments, the slew rate is determined based on the amount of overlap desired, the FOV of the optical assembly, the speed at which the satellite travels over the ground, and the side to side width of interest.

Precession Mode

The following are example and embodiments of precession-based cross-tracking. In precession mode, the telescope is not pointed straight down at the ground, but is at an angle and is rotating around the axis pointing down (e.g., precessing around the nadir direction as shown at 602 of FIG. 6), while moving along in its orbit in the orbit direction 604 of FIG. 6. Here, the telescope is scanning a spiral path over the ground.

Figure 6:
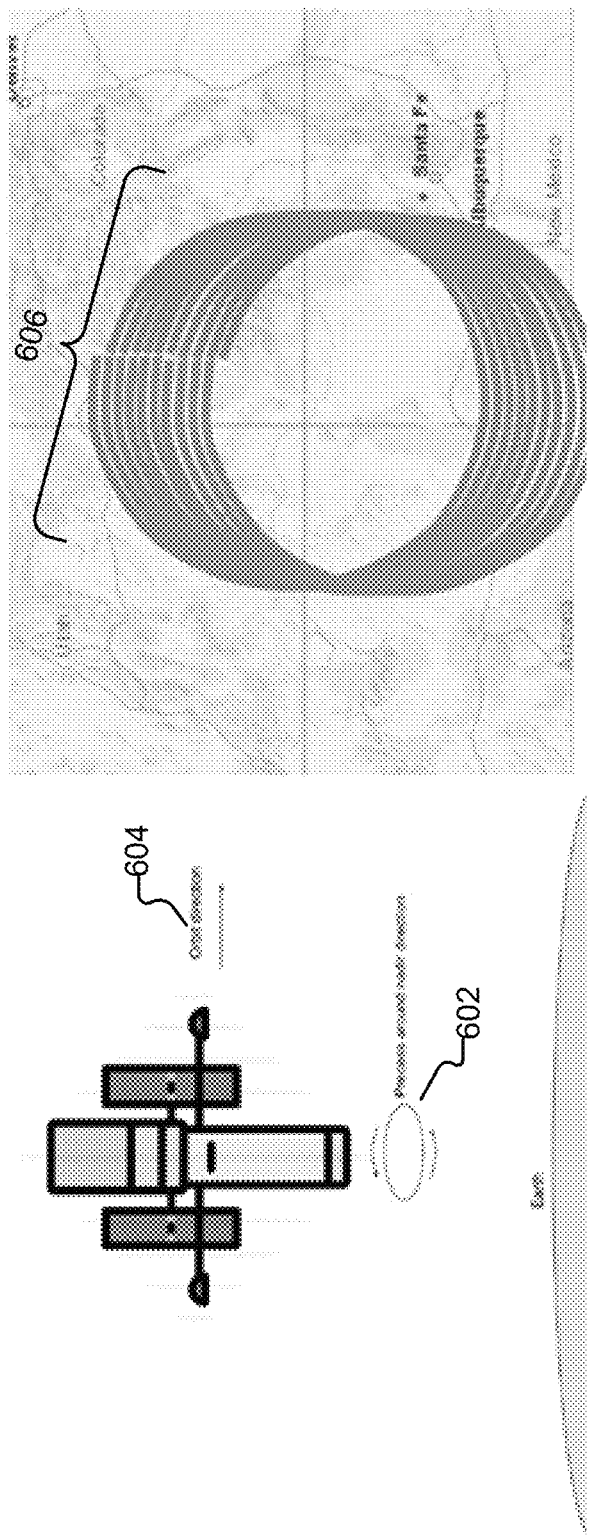
FIG. 6 illustrates an embodiment of precession-based cross-tracking.

FIG. 6 illustrates an embodiment of precession-based cross-tracking. In this example, cross-track scanning is implemented by inducing precession around a vector pointing toward the ground track, as shown at 602.

Shown at 606 is an image collection geometry over one minute for "precess" at 6 seconds per cycle. In this example, geometry of the strip is 26 km across at the nadir point for a 3 degree FOV, and 300 km diameter. The diameter may be increased to 1000 km when ground tracking of 500 km/s is supported.

One benefit of the precession-based cross-track scanning is that it does not require continuous attitude control correction. Once the precession motion is established, continuous correction need not be performed.

In various embodiments, physical scanning parameters for the precession-based cross-tracking include the angle of precession and the return rate (time to make a circle). The return rate may be controlled by the mass of the satellite and its moment of inertia (e.g., by applying or removing weight at a portion of the satellite).

The aforementioned parameters for the precession-based cross-track scanning may be determined based on, for example, a desired overlap given the motion along the orbit, the return time (e.g., time to complete a circle), etc. The size of the circle made by the precessing satellite may be a constraint given that the satellite may have a natural frequency of precession. Data rate (e.g., the amount of data that may be captured by the imager) may also be a constraint when determining the desired amount of overlap between circles. For example, the maximum data rate may be determined, where the physical scanning is then adjusted so that the resulting data rate does not exceed the maximum data rate. The thickness of the circle is defined by the FOV of the telescope. In the precession-based cross track scanning, the top and bottoms of a circle (as perceived from the perspective of the geometry shown at 606 of FIG. 6) will have the minimum overlap (because of the along-track motion of the satellite), while there will be more overlap on the left and right of the circle each time.

Camera Configuration

The following are embodiments of improvements to imagers in order to perform capturing of images at the faster rate that the swathes of the Earth are being scanned using the cross-track scanning described above. Using embodiments of the image capture techniques described herein, the image capture system 104 is able to maintain the same rate of progress of, or keep step with, the higher rate and coverage of cross-track scanning. The following include examples and embodiments of techniques for increasing camera capture rate (e.g., increasing the capture or imaging rate of image capture system 104).

The physical constraints on collection rate are largely ameliorated by the cross-track scanning techniques described above (as, for example, the scanning of the Earth is not limited to what is directly below the satellite as it progresses along the ground track, as is the case with existing satellite imaging techniques). Described below are embodiments of techniques for increasing the capture rate of an imager or camera system to accommodate or support the increases in surface scanning/observation rate provided by the cross-track scanning described above. The imager described herein is capable of capturing the increased amount of the Earth that the optical assembly is able to observe using the cross-track scanning described above (which provides increased coverage of the Earth and an increase in the rate at which the Earth is observed by the telescope).

As described above, when performing the cross-track scanning described above, the amount of the Earth that is observed by the telescope is increased by slewing the satellite rapidly back and forth across the track direction (e.g., slew-based cross track scanning), by nutating a spiral path along the ground track (e.g., precession-based cross track scanning), or spinning the entire optical assembly perpendicular to the orbit vector (e.g., spin-based cross track scanning).

As one illustrative example, with respect to the spin mode, at a spin rate of 20 rpm, the optical axis comes around again in 3 seconds, where the ground track has progressed by approximately 21 km. If the detector is 25 km wide, this will cause the swaths to overlap.

Physically, in this example, the Field of View (FOV) of the satellite is swept over a 2600 km track beneath the satellite in approximately 1 second. This is from -60 degrees to 60 degrees from nadir. With the spin-mode cross-track scanning, the collection rate is now 2600 km*26 km every three seconds, or approximately 22500 sq. km per second, which is 125 times of what is provided by existing satellites. This results in a much larger amount of Earth that is to be captured by the imager as compared to what existing imagers are tasked to capture.

The following are embodiments of imagers that are usable to capture images at the increased scan rate provided by the cross-track scanning above.

Rotated TDI Sensor for Cross-Track Scanning

As described above, to increase coverage and the rate of data collection, the satellite is physically manipulated to implement scanning such as cross-track scanning. In some embodiments, when performing such scanning, rather than using a typical camera sensor that is square or circular, an image sensor or camera array is used that is narrow (e.g., long and skinny), as there is a large focal plane, but what is being observed by the telescope is moving across the focal plane very quickly, and using the narrow array of sensors allows for capturing the dimension of scan direction with a smaller area than is needed in the other direction where there is no movement. In this way, a "line" is captured or imaged at a time.

One of the constraints on data rate from existing camera technologies such as CCDs is the line rate, or the rate at which data from a CCD can be read out. In some embodiments, time domain integration (TDI) is performed so that a pixel is exposed to light for a sufficient amount of time for the pixel to accumulate a signal.

For example, suppose that the ground is moving underneath, and there is a tree on the ground that happens to fit into a pixel. If the optical assembly is not being actively pointed, the tree will quickly move to the next pixel, where that first pixel may not have had enough time to sufficiently expose the tree to obtain a strong signal for the imager, which as one example is in the focal plane of the telescope.

In some embodiments, a "push-broom" technique is performed to increase the amount of exposure to a portion of the ground and to improve the amount of signal that is accumulated. This includes, for example, as the tree moves from one pixel to another, electronically shifting the electrons that were in that pixel into the next pixel to effectively "follow" the tree. Here, rather than the tree only being exposed to a pixel for the time it was within a pixel, the tree is exposed, for example, for all the time that the tree is in a column of pixels of the imaging sensor of the optical assembly.

While (time domain integration) TDI line rates have been used and have improved, the configuration of existing TDI sensors may not be sufficient to capture the increased collection rate afforded by the cross-track scanning described herein. Improvements to TDI line rates are described below.

Figure 7:
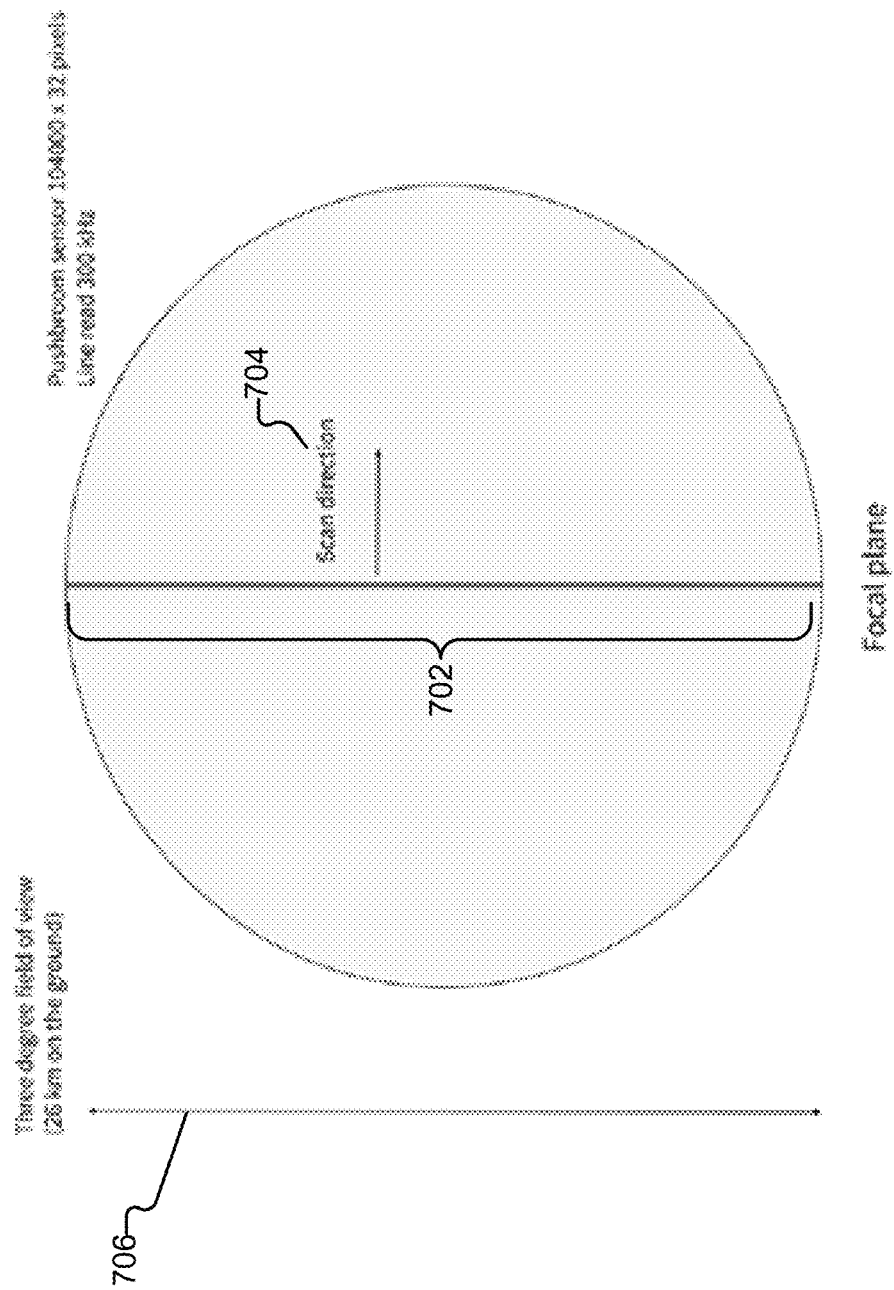
FIG. 7 illustrates an embodiment of a TDI sensor oriented for cross-track scanning.

In some embodiments, in order to account for cross-track scanning, where the telescope is slewing across the track direction of the satellite, the TDI sensor is rotated by 90 degrees from its typical orientation if along-track scanning were performed, as in existing imaging systems. That is, for cross-track scanning, the scan direction of the TDI sensor is perpendicular to the ground track direction of the satellite. An embodiment of a rotated pushbroom sensor is shown in the example of FIG. 7. In the example of FIG. 7, the TDI sensor is oriented such that the width of the TDI sensor is oriented facing with the scan direction, where the scan direction is across the ground track of the satellite.

FIG. 7 illustrates an embodiment of a TDI sensor oriented for cross-track scanning. In this example, a pushbroom sensor that is 104,000×32 pixels is shown at 702. As shown in this example, the width of the pushbroom sensor is oriented facing the scan direction 704. The field of view is indicated at 706, and in this example is a three degree field of view, which translates to 26 kilometers on the ground.

As described above, in this example, the TDI sensor is rotated by 90 degrees from the conventional orientation (for conventional along-track scanning) to account for cross-track scanning so that the full width of the TDI sensor is oriented facing towards the scan direction/direction of the slewing of the satellite across the ground track.

As one illustrative example, the pushbroom sensor configuration shown in FIG. 7 is capable of collecting or capturing images or frames of 2000 sq km/s at 25 cm GSD (ground sample distance). For existing ground-rate sensors, the line speed is approximately 30 Hz. Sensors with a line rate of up to 300 kHz, such as TDI CMOS image sensors, may be used to support a cross-track scanning speed of, for example, 80 km/sec.

The TDI sensor may have various constraints, such as how often data can be read out of the sensor. Another example constraint is the width of the image data. In some embodiments, the sensitivity of the TDI sensor is controlled by the width of the time delay integration sensor (e.g., the number of pixels across the sensor). In some embodiments, the cross-track scanning is adjusted based on the line rate limit of the TDI sensor. For example, the maximum line rate or readout rate of the TDI sensor may be the limiting factor or constraint with respect to data rate, and to accommodate this, the cross-track scanning may be slowed down so that the rate at which the surface is physically scanned matches to the data capture rate of the TDI sensor.

Array of Fast Steering Mirrors

While the use of time-delay integration sensors, such as CMOS TDI sensors oriented as described above, increases the data rate multiple times as compared to existing instruments, it may still be less than the data rate needed to achieve capturing a desired surface within a threshold amount of time (e.g., capture images of the entire Earth surface in a day).

Modern CMOS sensors may handle frame rates of 1000 frames per second, allowing higher image capture rates to be achieved. In some embodiments, rather than have the imager at the focal plane of the telescope to capture the light directed by the mirrors directed by the telescope, an array of fast steering mirrors is placed along the axis of the focal plane of the telescope or optical assembly to compensate for the rapid field motion (e.g., that is induced by cross-track scanning). In some embodiments, the mirrors illuminate a pixel array such as a gigapixel array of CMOS image sensors (e.g., 100 k×16 k pixels), with an image produced every millisecond (e.g., 1000 images per second, per the CMOS frame rate). Further details and embodiments regarding the use of an array of fast steering mirrors are described below.

In some embodiments, the array of fast steering mirrors (e.g., steering mirror array 108) is used to freeze the ground motion onto an array of frame imagers. As will be described in further detail below, in some embodiments, as an additional optimization, feedback from the imaging system to the control of the steering mirrors is used to stabilize the scene that is being captured by the imager. In some embodiments, steering mirrors are used instead of, or in addition to, the aforementioned TDI techniques described above to further increase the camera data capture rate.

In some embodiments, the steering mirrors are in the focal plane of the telescope. Here, where a typical telescope would have a camera, there is instead an array of steering mirrors which then transport the observed scene (e.g., collected light) to the camera. In this example, instead of the camera being in a typical optical line, the imager (e.g., array of image sensors) is now off to the side where the steering mirrors relay what is being seen by the telescope to the image sensors.

Here, rather than clocking the electrons across the pixels of the image sensor as with a pushbroom TDI sensor, the steering mirrors are used to keep the image steady on the camera. For example, as the satellite is orbiting by, the tilt of the mirrors is adjusted to keep the tree in the same pixel. Once the image is captured, the steering mirrors are quickly tilted back to the other ends of its view to start with the next image capture.

Figure 8:
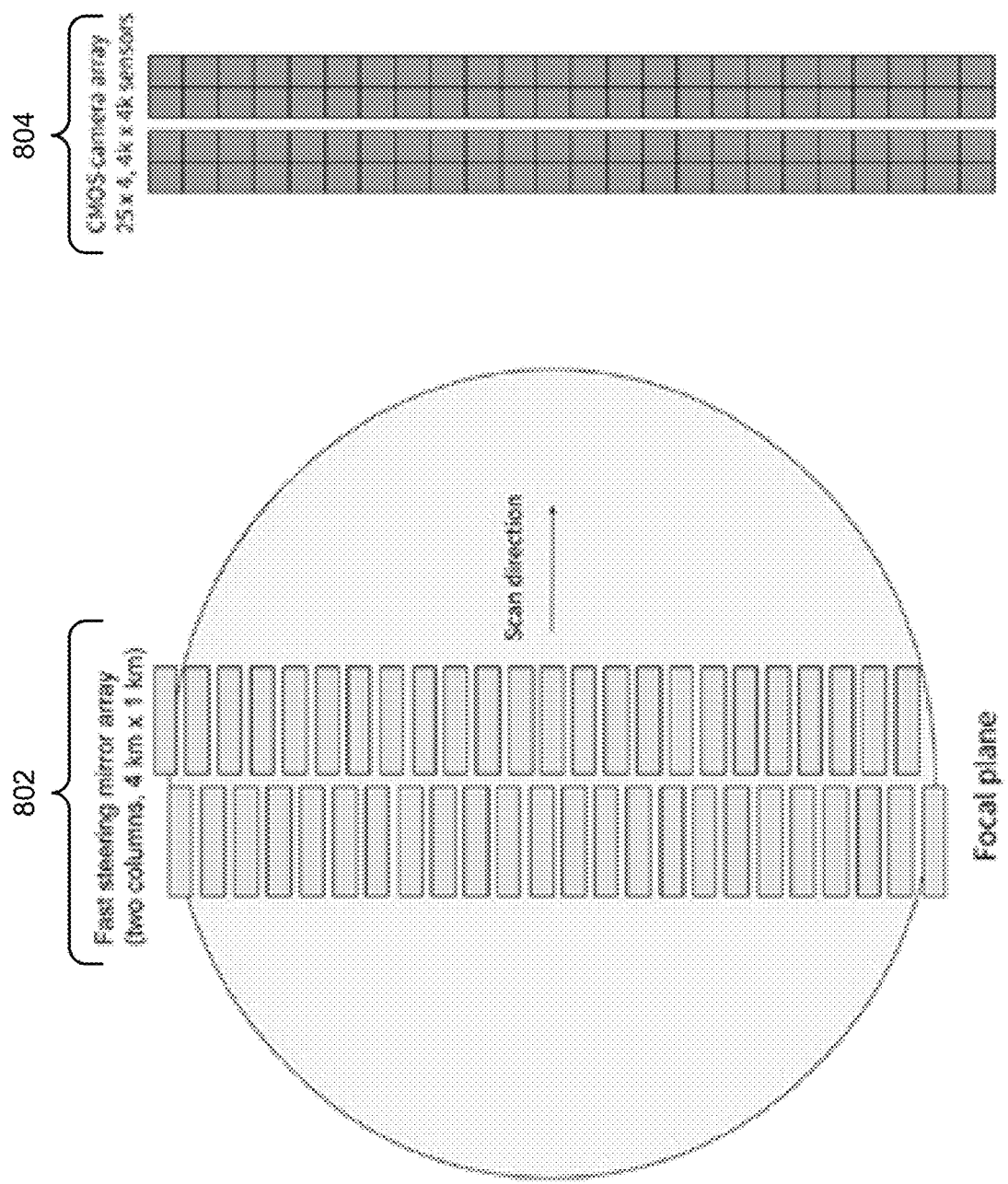
FIG. 8 illustrates an embodiment of a fast steering mirror array configuration.

FIG. 8 illustrates an embodiment of a fast steering mirror array configuration. Shown in this example is a fast steering mirror array configuration 802 for a camera. The example configuration shown is capable of collecting 60,000 sq km/s at 25 cm GSD. As shown in this example, a CMOS camera array 804 is laid out 4 across and by 25 vertically, where there are 100 independent image sensors that are, for example, 4K by 4K pixels. In this example, the steering mirror array 802 includes two columns of mirrors, where there is one mirror for each row of sensors in each two-wide column of CMOS camera sensors. As shown in this example, the array of steering mirrors is placed along the axis of the focal plane of the telescope.

In this example, to achieve a 25 centimeter resolution (e.g., ground sample distance (GSD) or spatial/image resolution), the area that the mirror observes is 4 kilometer by 1 kilometer on the ground. That 1 kilometer at 25 centimeter resolution results in the 4K pixels in the image sensor. In this way, the distance between pixel centers is 25 centimeters measured on the ground. In this example, the large circular mirror (one of the mirrors in the TMA, for example) is 130 cm, which defines the aperture. The aperture is set by the desired resolution. The 1.3 meter mirror is used to achieve the 25 cm resolution. For higher resolution, such as 10 cm resolution, the aperture would need to be over three meters. The number of steering mirrors and sensors then scales by approximately three times as well to compensate for the larger focal plane in higher resolution by having more sensors (e.g., more 4 k sensors if 16 k×16 k sensors are not available).

In some embodiments, the use of an array of steering mirrors, in conjunction with various different camera sensors in parallel, allows for capturing what (e.g., the surface or portion of the Earth being imaged) is flowing across the telescope as the telescope is scanning across the landscape.

This camera configuration with an array of fast steering mirrors provides an increase in the data collection rate. For example, the push-broom technique described above may be limited by the rate at which electrons can be moved from pixel-to-pixel, which may be limited by the transistors in the electronics. For example, suppose that the maximum shifting rate is 300,000 hertz. Given the speed that a 25 centimeter pixel would be moving across the image sensor, this would require a readout rate of approximately 10 megahertz, which is approximately 30 times faster than the example maximum shifting rate above 300,000 hertz achievable using CMOS sensors.

Such a limit does not exist with mirrors, as the mirrors are in the physical domain. Here, the mirror is adjusting for the slew of the satellite (e.g., where the satellite is being slewed for cross-track scanning, as described above) so that the mirror can keep the image or portion of the landscape being imaged stationary on the array of image sensors.

In some embodiments, the number of image sensors used in the steering mirror architecture may be adjusted based on the cross-track scanning being performed. For example, if a smaller image sensor array were to be used (e.g., because it is more inexpensive), then the physical cross-track scanning rate can be slowed down. If the scan rate across the ground were half as much, the width of the imagers could be halved as well.

Coarse control adjustment of the array may be predictable, as each mirror will be controlled in the same manner to point its rectangle of the Earth to the camera. In some embodiments, control of the steering mirror array may be optimized by using the imager itself to assist in controlling the steering mirrors. The image is to be fixed/frozen, and not moved. If the image is not fixed, then an object or feature that should be in one place will drift to another part of the image. In some embodiments, motion is detected, and feedback is performed to correct the steering mirrors in response to the detection of motion. For example, if it is determined that an object or feature (e.g., a bright spot) has moved to the left, this information is used as feedback to control the steering mirrors to point back to the right. This would remove fine scale motions that should be corrected for, where the steering mirrors are usable for fine scale, fast adjustments.

In some embodiments, the motion information may also be sent as feedback to the satellite attitude and orbit control system itself. For example, suppose that given the track of the orbit, the satellite is expected to be pointed at a certain part of the Earth. The imager provides, for example, better than 25 cm resolution, of where the satellite is actually pointed. Based on this difference between the expected position and the actual detected position, a correction to the satellite may be performed by the satellite control system, where attitude control such as spin rate may be adjusted (where the adjustment to the satellite attitude control would be on a longer timescale than the images themselves). The adjustments to the attitude control (e.g., cross-track scanning) may be made according to a physics model that determines what force to apply at what time for the desired control. Here, the camera is used to control the mirror in a feedback loop.

While TDI does not require the use of steering mirrors, the pixels that are produced from TDI may be less than what can be achieved using a steering mirror array. Due to the lower readout rate of TDI, the cross-track scanning described above may be slowed down so that the resulting data collection rate does not exceed the readout rate of the image sensors.

In some embodiments, both high data rate time delay integration and an instrument for cross-track scanning as described above are used together, providing an improvement to existing satellite imaging technology. The steering mirrors described above may then be used as an additional component to further increase the data collection rate.

Onboard Processing

As described above, the cross-tracking scanning and imager configuration described above allow for much greater collection rates of satellite imagery as compared to existing techniques for collecting high-resolution optical satellite imagery. For moderate resolution imagery, this increased data rate may be managed with existing technology. However, for high-resolution imagery, advances in camera technology are utilized to allow for collection rates that are much larger than the natural collection rate defined by the movement of the satellite over the ground. The resulting data rates using the cross-track scanning and camera configuration techniques described above may greatly exceed the capacity of existing X-band downlinks (~1 Gbit/sec). To address this difference in collection data rate and downlink capacity, onboard processing is performed at the satellite to fully maximize the benefit from the increased data collection rate techniques described above.

Typically, the amount of data that can be provided from the satellite to the ground is approximately 4 terabytes per day. However, using the enhanced data collection techniques described above, 1,000 gigapixel images may be produced every second. This is a terapixel per second, which is a factor of several thousand times higher than the aforementioned typical downlink bandwidth of 4 terabytes per day.

That is, using the cross-track scanning and camera configuration techniques described above, the imager generates ~1000 gigapixel images during the second it is pointed at the Earth. There may be a limited amount of time (e.g., 2 seconds) to process this data before the next batch of pixels arrives. (After 45 minutes, the night side may provide 45 minutes of respite).

Described herein are techniques for providing a terapixel per second of onboard processing. In some embodiments, the onboard processing includes selectively determining what pixels to be transmitted and shows what pixels should not be transmitted, where, for example pixels with potential value are extracted from the raw data, and the bandwidth is used to transmit only those pixels determined to be of potential value. Using the onboard processing techniques described herein, where the workflows are highly parallel, the collected data rate is reduced. For example, with a downlink budget of 4 TB per day, the amount of collected data may be reduced by a factor of 3000 using the techniques described herein, where pixels of potential value are extracted from the raw images that are collected, while those pixels that are determined to not be of potential value (e.g., according to some threshold criteria) are filtered out, causing undesired pixels to be discarded at the satellite before they take up downlink budget. That is, the onboard processing (performed, for example, by computing module 116) is configured to process the raw image data that is collected and selectively determine what pixels to send and what to discard. This is in contrast to existing satellite imaging systems, where all raw data is transmitted to the ground, where post processing is performed at the ground.

In some embodiments, encoding, such as HTJ2k (High-Throughput JPEG 2000) encoding, is used to reduce the amount of data (e.g., by a factor of 10). After this encoding, the data can be further filtered based on a determination of whether a set of pixels is of interest, as described above. For example, suppose that pixels that have clouds or oceans are defined as being not of interest. In this case, the raw data can be further filtered by 90% based on whether it has clouds or oceans. For example, images with clouds or images with oceans are often not of interest; however, oceans make up 70% of the collected data, and clouds make up two-thirds of collected images. In some embodiments, if images of clouds or oceans are not of interest, the onboard processing includes algorithms for detecting pixels with clouds and oceans and discarding them, thereby reducing the amount of data (that has been defined as not being of potential value) that is downlinked or otherwise utilizing the bandwidth for only those pixels determined to be of potential interest. Further details regarding performing analytics in orbit are described below.

Thus, the onboard processing described herein may be used to address the higher data rate from the image sensors that is facilitated using the cross-track scanning and camera configuration described above, where the data rate of the output of the image sensors may exceed the available capacity of the communication downlink (in some cases this may not be applicable for TDI, where compression of the raw data may be sufficient to downlink all of the raw data that is generated from the image sensors).

In some embodiments, and as will be described in further detail below, the pixel extraction techniques described herein allow for the reduction of collected raw data to the extent that it can be cached via onboard storage. For example, the pixel reduction techniques described herein may be used to reduce the amount of collected data by a factor of 100, in which case 120 TB of onboard storage would be sufficient to cache the past 24 hours of data. Further details regarding post-event tasking, such as onboard caching, are described below.

In various embodiments, onboard processing of raw image data for software defined satellite imagery includes performing analytics in orbit and post-event tasking. In some embodiments, performing analytics in orbit includes performing fast geolocation, change detection, and image-differencing compression. In some embodiments, post-event tasking includes onboard storage, onboard compression, and current events cueing.

Using the software-defined satellite imagery techniques described herein, including performing onboard processing rather than post-processing on the ground, many more usable pixels may be produced from the downlink as compared to previously.

Analytics in Orbit

The following is an example overview of steps for onboard processing of collected raw image data. In some embodiments, the analytics described herein are performed by computing module 116 of satellite 100.

1. Geolocation is performed versus an onboard reference image
2. Clouds are detected
3. Ships in the ocean are detected
4. Known areas of interest are saved
5. Change detection and merging (such as at edges) are performed
6. Clouds, oceans, and static areas are eliminated.

The following are further example details and embodiments of various portions of the above example overview of onboard processing.

In some embodiments, the geolocation includes determining where the telescope is pointing (e.g., latitude and longitude determined using a GPS sensor and telescope pointing angles). In some embodiments, the satellite has onboard an image that is expected to be observed at that location. For example, the satellite has a catalog of reference imagery.

While the satellite is able to determine where it is looking (e.g., within 100 meters), the onboard processing may be used to determine within centimeters where each pixel is. In some embodiments, the satellite geolocates captured pixels versus the onboard reference expected or predicted image.

If the images are from the same location, at the same angle, with the same sun conditions, then a direct comparison can be made between the collected and the expected images, without requiring performing any transformations to normalize the two images.

However, the reference image and the collected image may be different if, for example, they were taken from different angles. In this case, prior to comparing, image geo-registration is performed to align the two images for comparison. As there is a relatively small amount of time to perform the image registration (e.g., due to the new batch of pixels being captured), in some embodiments, a model of the Earth is established along with the reference images to allow rapid referencing to what is observed.

The combination of the reference image of the Earth, along with geo-contextual information of the collected image and/or reference image, such as the elevation of each of the pixels, allows for a transformation on that reference image to be performed so that the transformed version of the reference image appears to be from the perspective of where the satellite is at (when capturing the collected image to which the reference image is compared). Transformation may also be applied to the captured image in addition to, or instead of, the reference image. Here, transforming the reference image includes geographically aligning the reference image with the collected image.

After the transformation is applied to the reference image, a co-registration algorithm may be applied to determine the offset between the collected and transformed reference image. As one example, the offset that is determined includes two values, an X-axis offset, and a Y-axis offset. This is in part because warping is removed after performing the initial correction to the reference.

In some embodiments, determining the offset includes finding a mis-registration. The following are two examples of algorithms for determining the offset. One example is a Fourier transform-based technique. Both images are put into the algorithm which returns an output that indicates the number of pixels to shift an image by in order for the two images to be precisely registered (e.g., 12 pixels over and up 14 pixels).

The alignment may be performed using a portion of the images that match. For example, if an entire collected image is all clouds, then the system may be unable to find a reference at all. However, as long as a portion of the collected image matches to a part of a reference image, then the images can be aligned, and the differences between the images can be identified.

After the transformation and alignment is performed, the offset that is determined may then be used to locally perform processing, such as local cloud detection or detecting objects in the ocean at the satellite, or determining changes between the two aligned collected and reference images.

For example, suppose that the satellite expects to observe city or green fields (based on the aligned geolocated reference image), but instead the raw collected image is of a big gray or white flat field, then this is an indication, with a high likelihood or confidence, that the collected image is of a cloud. On the other hand, the confidence returned by the cloud detection algorithm of the likelihood of clouds may be low if White Sands in New Mexico were being observed, which has a large deposit of gypsum sand that is bright white, which most cloud detectors would identify as clouds, even if they actually are not.

This form of cloud detection, by detecting brightness and whiteness in collected imagery, is a form of cloud detection that is more power efficient and may be better suited to being run on a satellite that may have constrained computing capabilities, and is less computationally expensive than other cloud detection techniques.

In some embodiments, if clouds are detected, and the computing module has been configured to determine that images with clouds are not of potential interest, then the collected image is discarded and is not downlinked from the satellite to the Earth. For example, typically, two-thirds of pixels are obscured by cloud. Discarding images with clouds locally at the satellite provides a factor of three improvement in decreasing the amount of bandwidth used.

In some embodiments, the cloud detection algorithms provide as output a level of confidence that a collected raw image has clouds. An adjustable threshold level of confidence may be set to determine whether to filter out or discard a given collected raw image.

In some embodiments, the onboard processing includes performing change detection to determine a difference between the collected raw image and the corresponding (aligned) reference image. As one example, suppose that the reference image at the geolocation of the collected image is of empty ocean, and the collected image includes the presence of a ship in the ocean. Comparison of the two images may be used to determine a change or difference between the two images. Here, the presence of a change or difference may be used to determine that the collected image is of interest and should be retained and downlinked. On the other hand, if both images are of empty ocean, or there is no difference (e.g., both images have structures in the ocean, but there is no discernable change), then the collected image may be discarded.

In some embodiments, the onboard processing, such as the selective filtering described above, is configurable. As one example, a consumer or user of the services and satellite imagery provided by the satellite can specify the parameters of the image capturing, as well as define the criteria for keeping and/or discarding raw data.

For example, a consumer may indicate that they are interested in imagery of a specific airport (e.g., specific location on the Earth) on a daily basis (e.g., with a specified periodicity). Here, the subscriber may specify the locations of sites to be monitored. In this way, the satellite is configured with locations of interest. The satellite may be provided, or itself capture, reference images for the specified locations of interest. Raw data collected for those sites of interest may be saved (subject to any other filtering criteria, such as filtering based on the presence of clouds, as described above).

The subscriber may further specify filtering criteria on the raw image data for the locations of interest. For example, as described above, the user may specify that they would like the satellite to downlink any collected imagery that is not covered by clouds. In some embodiments, the subscriber or user is provided the option to set a threshold level of clouds detected for determining whether to filter out or reject/eliminate a collected image (e.g., the subscriber may still wish to see collected imagery, even if it is partially obscured).

The satellite (e.g., the computing module 116 of the satellite) then uses this configuration to determine, onboard, whether to filter the collected images. In this way, the collected raw images are passed through cloud detection as described above, and any images at the locations of interest with clouds are discarded, and images without clouds at the locations of interest are transmitted from the satellite.

In this way, the subscriber may prioritize or rank various types of image data. As the subscriber may have some budget for the amount of data that can be sent down to them from the satellite, via the prioritization described above, the subscriber can rank how valuable various types of data are, where, for example, the data may be sent down in decreasing value until the subscriber has run out of bandwidth.

In some embodiments, the software-defined satellite imagery techniques described herein include techniques for image-differencing compression, further saving bandwidth. As described above, registration may be performed to determine differences between a collected raw image and a reference image. In some embodiments, even if a collected raw image is not filtered out and is retained, rather than sending the entire collected raw image, the delta or difference between the collected raw image and the reference image is transmitted. The entity or party receiving the delta is provided or otherwise has access to a copy of the reference image, and can then apply the delta to the reference image to arrive at the collected image. Such compression by only communicating changes is beneficial, as it would, for example, cover a large portion of the Earth where there are minimal changes occurring.

The various onboard analytics processing described herein are power efficient, and designed for being run on a satellite that may or may not have qualified hardware, and which may have various performance constraints, such as with respect to computing capacity, memory capacity, power (e.g., due to being powered by solar panels and batteries), etc.

Post-Event Tasking

In some embodiments, the satellite is designed to include additional storage or memory (e.g., onboard cache 118) to act as a cache or buffer for raw satellite imagery. For example, raw data (either prior or subsequent to the onboard analytics described above) may be recorded and maintained for a threshold period of time (e.g., kept for a day before it is flushed from the storage and new raw image data is stored).

This provides various benefits. For example, it allows for a time delay in deciding what image data for the satellite to send, and also allows for retroactive extraction of data. For example, oftentimes a consumer of the image data may not know that they wanted to look at something until after some event. Here, by using the local storage buffer, a user can still have the opportunity to request and downlink raw image data even several days after it has been collected (rather than the image data being discarded such that the image data can no longer be extracted).

Thus, using the software-defined satellite imagery techniques described herein, the rate at which raw satellite imagery is collected by the satellite is greatly increased compared to existing satellites. Further, the software-defined satellite imagery techniques described herein facilitate onboard processing of the collected raw image data to selectively determine what should and should not be downlinked from the satellite, thereby conserving use of limited bandwidth to raw image data that is of value, rather than, for example, attempting to simply downlink all collected raw imagery.

The software defined satellite imagery techniques described herein provide various benefits compared to existing satellite imagery techniques. For example, cheaper image collection is facilitated using the software defined satellite imagery techniques described herein by replacing expensive and heavy instrumentation for pointing accuracy with software. Further, expensive downlink bandwidth is replaced with software (e.g., via the onboard processing described above). In this way, lower launch costs can be capitalized upon. As another example benefit, faster image collection is facilitated using the instrument designs provided by the software defined satellite imagery techniques described herein, such as via the cross-track scanning described herein. For example, by reducing spin rate, the night side of the Earth may be imaged. If the spin rate were reduced even further, objects in orbit may be observed and captured. As yet another example benefit, improved images may be collected and provided using the software defined satellite imagery techniques described herein. For example, all potentially interesting pixels are made available on-board for a period after collection (e.g., 24 hours) using the onboard storage described above. Further, the onboard processing and storage techniques described herein provide the capability of post-event tasking.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A satellite, comprising:
   an optical assembly;
   an attitude control system, wherein the attitude control system is configured to control an orientation of the satellite such that the optical assembly nutates a spiral path along a ground track of the satellite, the ground track along which the optical assembly nutates the spiral path comprising a path on a surface below a trajectory of the satellite, and wherein the nutating the spiral path along the ground track of the satellite is facilitated at least in part by inducing precession about a nadir direction based at least in part on a scanning parameter comprising an angle of precession;
   a set of image sensors configured to capture an image using light directed to the set of image sensors at least in part by the optical assembly, wherein the captured image is cached via onboard storage of the satellite; and
   a set of processors configured to perform onboard processing of the captured image locally at the satellite, wherein processing the captured image locally at the satellite comprises:
      determining, onboard the satellite, a likelihood of a presence of clouds in the captured image based at least in part on a corresponding onboard reference image and based at least in part on detecting, onboard the satellite, brightness or whiteness in the captured image; and
      based at least in part on the likelihood of the presence of clouds in the captured image determined onboard the satellite, discarding the captured image that is cached via the onboard storage of the satellite, such that the discarded captured image is not transmitted from the satellite.

2. The satellite of claim 1, wherein the attitude control system is configured to control the orientation of the satellite such that the optical assembly spins perpendicular to an orbit vector.

3. The satellite of claim 1, wherein the attitude control system is configured to control the orientation of the satellite such that the optical assembly sweeps back and forth across the ground track.

4. The satellite of claim 1, wherein the set of image sensors comprises a time delay integration (TDI) sensor, and wherein the TDI sensor is oriented such that a scan direction of the TDI sensor is perpendicular to the ground track of the satellite.

5. The satellite of claim 1, wherein the satellite comprises an array of steering mirrors, and wherein the steering mirrors are used to direct the light to the set of image sensors.

6. The satellite of claim 5, wherein the array of steering mirrors is along an axis of a focal plane of the optical assembly.

7. The satellite of claim 1, wherein the set of image sensors comprises an array of CMOS (complementary metal-oxide-semiconductor) sensors.

8. The satellite of claim 1, wherein the attitude control system is configured to adjust the orientation of the satellite based at least in part on an evaluation of the image captured by the set of image sensors.

9. The satellite of claim 1, wherein the satellite comprises an onboard data storage, and wherein the image captured by the set of image sensors is buffered to the onboard data storage.

10. The satellite of claim 1, wherein processing the captured image locally at the satellite comprises identifying the corresponding onboard reference image from a plurality of onboard reference images.

11. The satellite of claim 10, wherein the corresponding onboard reference image is identified based at least in part on a geolocation of the captured image.

12. The satellite of claim 1, wherein processing the captured image locally at the satellite further comprises performing geo-registration of the captured image and the corresponding onboard reference image.

13. The satellite of claim 1, wherein processing the captured image locally at the satellite further comprises determining the likelihood of the presence of clouds at least in part by comparing the captured image and the corresponding onboard reference image.

14. The satellite of claim 1, wherein processing the captured image locally at the satellite comprises determining whether the captured image is of a portion of an ocean.

* * * * *